Oct. 21, 1924.

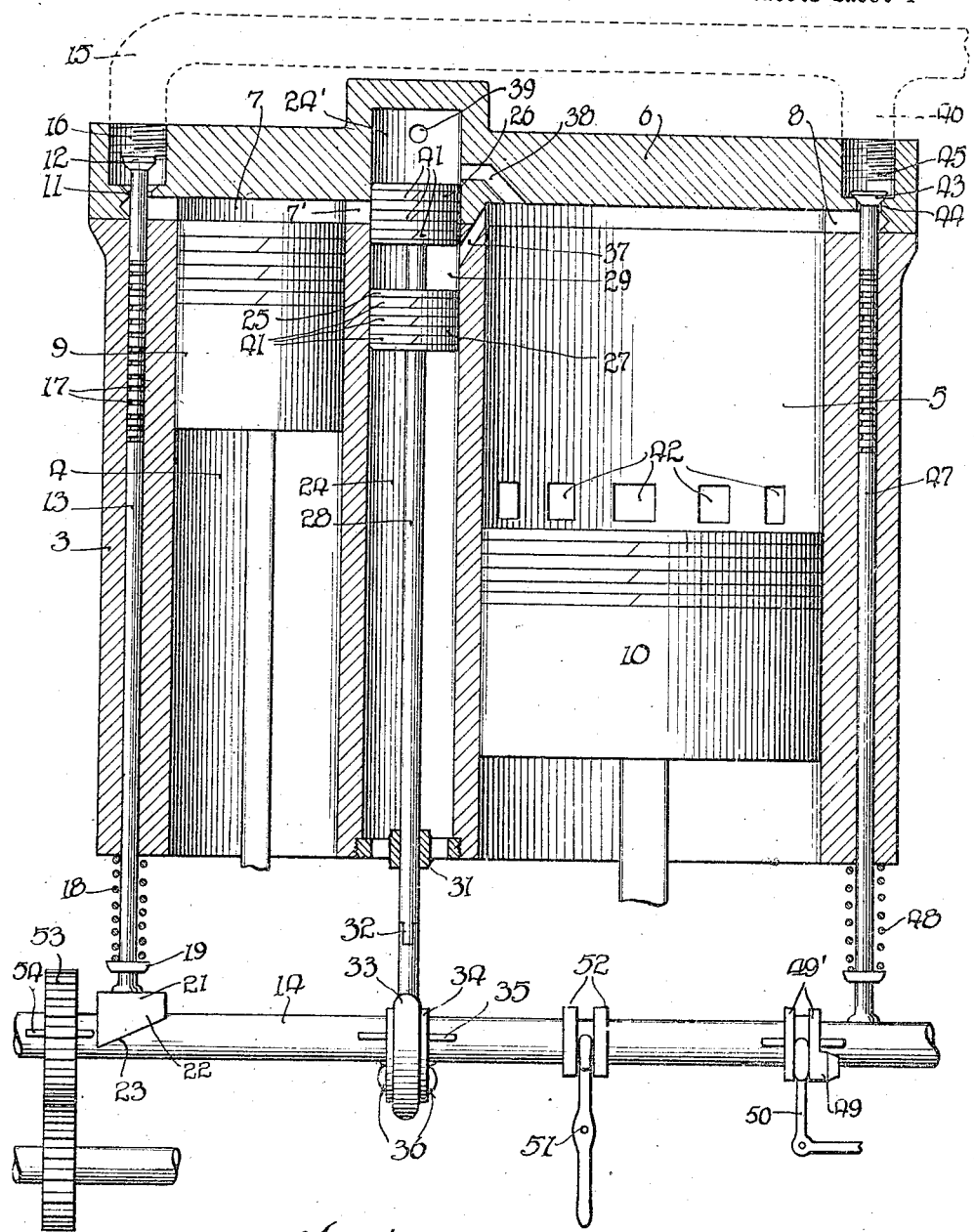

L. M. ELLIS 1,512,205

VALVE GEAR FOR STEAM ENGINES

Filed Oct. 24, 1921    2 Sheets-Sheet 2

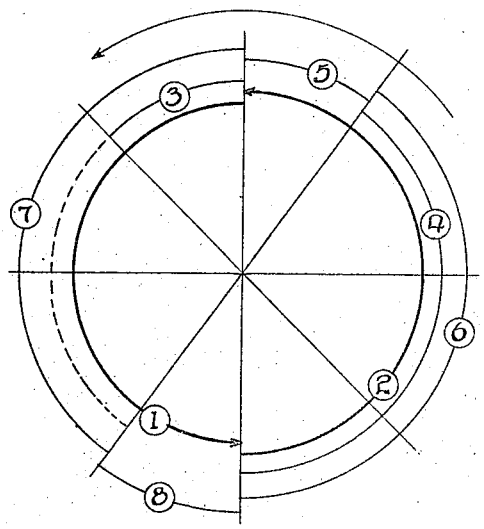

Fig. 2

① POWER STROKE HIGH PRESSURE PISTON
② POWER STROKE LOW PRESSURE PISTON
③ ADMISSION HIGH PRESSURE CYLINDER (15% TO 80%)
④ EXHAUST HIGH PRESSURE CYLINDER
⑤ COMPRESSION HIGH PRESSURE CYLINDER
⑥ ADMISSION LOW PRESSURE CYLINDER
⑦ EXHAUST LOW PRESSURE CYLINDER
⑧ COMPRESSION LOW PRESSURE CYLINDER

Inventor
Lewis M. Ellis

By Brown, Boettcher & Pierre
Att'ys

Patented Oct. 21, 1924.

1,512,205

UNITED STATES PATENT OFFICE.

LEWIS M. ELLIS, OF CHICAGO, ILLINOIS; GEORGE M. ELLIS, ADMINISTRATOR OF THE ESTATE OF SAID LEWIS M. ELLIS, DECEASED, ASSIGNOR TO WINSLOW SAFETY HIGH PRESSURE BOILER COMPANY, OF CHICAGO, ILLINOIS, A CORPORATION OF ILLINOIS.

VALVE GEAR FOR STEAM ENGINES.

Application filed October 24, 1921. Serial No. 509,930.

*To all whom it may concern:*

Be it known that I, LEWIS M. ELLIS, a citizen of the United States, residing at Chicago, in the county of Cook and State of Illinois, have invented a certain new and useful Improvement in Valve Gears for Steam Engines, of which the following is a full, clear, concise, and exact description, reference being had to the accompanying drawings, forming a part of this specification.

The present invention relates to valve gear for steam engines, and has particular, though not essential reference to valve gear for compound engines. The term "compound" is herein used in its broader sense to include double, triple and quadruple expansion engines.

One of the principal objects of the present invention is to provide an improved arrangement of transfer valve intermediate the successive cylinders of a multiple expansion engine. The present valve is of balanced construction and is preferably of cylindrical form in order that it may utilize piston rings for maintaining a tight joint against high steam pressures. These features are of particular importance in high pressure operation, the use of initial steam pressures in the neighborhood of 500 to 600 pounds being contemplated in the present engine. As a further characteristic the valve affords a compression relief function for the low pressure cylinder. This feature has specific applicability to a compound engine wherein the low pressure cylinder operates under a uniflow cycle, and affords a relief against the building of excessive compression pressures without any material complication of the valve gear.

In its preferred embodiment the present engine has a simpling valve for the low pressure cylinder. It is a further object of the invention to provide a simplified arrangement of valve gear designed to operate this simpling valve for the low pressure cylinder when an abnormally high torque is desired, as for starting or emergency use.

Referring to the accompanying drawings wherein I have illustrated a preferred embodiment of my invention:

Figure 1 is a diagrammatic sectional view of the upper part of the engine; and

Figure 2 is a valve event diagram illustrating the cycle of the valve mechanism.

The cylinder block of the engine preferably consists of a single casting 3 in which are bored the high and low pressure cylinders 4 and 5, respectively. Only a double expansion construction is illustrated, but it will be apparent that certain features of my invention have equal applicability to triple or quadruple expansion engines as well. The crank shaft and lower supporting structure of the engine are not illustrated as their arrangement is obvious and has no part in the present invention. The tops of the cylinders 4 and 5 are closed by a cylinder cover 6 which extends across and is secured to the top of the block 3. The bottom of the cylinder cover 6 is formed with valve chamber depressions 7 and 8 for the high and low pressure cylinders, respectively.

Steam is admitted to the high pressure cylinder 4 and the piston 9 through an admission port 11 opening into the valve chamber 7. This admission port is controlled by an outwardly opening poppet valve 12, the stem 13 of which extends downwardly through the cylinder block 3 for actuation by the cam shaft 14. A steam supply pipe 15 extending from the boiler connects with the pocket 16 into which the valve 12 opens. Valve stem 13 is preferably provided with a plurality of annular grooves 17 to form a labyrinth packing, or any other suitable form of packing may be employed. The valve 12 is normally held seated by a compression spring 18 at the lower end of the valve stem, bearing against a collar 19 thereon. The tappet end 21 of the valve stem is adapted to be engaged by a relatively long cam 22. The raising edge or slope of the cam 22 extends in substantially parallel alignment with the axis of the shaft 14 while the drop-off or valve closing shoulder or incline 23 is extended diagonally across the axis of the cam shaft 14 to permit of variations in cut-off.

Intermediate the high and low pressure cylinders 4 and 5 is a cylindrical valve chamber 24 in which reciprocates a transfer valve 25 adapted to control the transfer of steam from the high pressure cylinder 4 to the low pressure cylinder 5. This valve comprises upper and lower pistons 26 and 27 mounted on a valve stem 28 with a steam space 29 intervening. The lower end of the valve stem 28 is guided in the hub of a spider 31 mounted in the lower end of the bore 24, and below this spider the stem 28 has pivotal connection at 32 with an eccentric strap or band 33 encircling an eccentric 34 of the cam shaft 14. The eccentric 34 has driven connection with the cam shaft 14 through a longitudinal key 35 which permits the cam shaft to be shifted relatively to the eccentric without interrupting the driving relation, the eccentric being preferably held between lateral guiding members 36. The bore 24 is extended up into the cover plate 6 where a closed chamber 24' is provided for guiding the upper piston 26 and for establishing a compression relief connection with the low pressure cylinder 5. The space 7 for the high pressure cylinder 4 opens directly into the chamber 24, and is adapted to have valved communication with the space 29 under the control of the valve pistons 26 and 27. Similarly, the space 8 communicates with the bore 24 through a diagonal passageway 37 at a point below the level of the port opening 7' into the high pressure cylinder. Extending diagonally upwardly from the valve chamber area 8 is a passageway 38 which is adapted to open into the bore 24' under the control of the valve piston 26. A port 39 leads outwardly from the upper end of the port 24' for venting or conducting to some point of usage the steam which is directed into the bore 24' during the compression relief event. Both pistons 26 and 27 have a plurality of piston rings 41 for preventing leakage of the high pressures admitted to the high pressure cylinder 4.

The low pressure cylinder 5 is of the uniflow type, having a plurality of terminal exhaust ports 42 in the cylinder wall at the bottom of the piston stroke. For simpling the engine, there is provided a simpling valve 43 of the poppet type which controls a valve port 44 arranged to admit steam under boiler pressure directly to the low pressure cylinder 5. The valve 43 opens into a pocket 45 which has connection through a branch 46 with the main steam supply pipe 15. The valve stem 47 is provided with a labyrinth packing similar to the stem 13, and at its lower end carries a compression spring 48 which normally tends to hold the valve 43 seated. A cam 49 is splined for shifting movement on the cam shaft 14 and is arranged to be brought into operative alignment with the tappet end of the stem 47 by a shifting fork 50 engaging between collars 49' on the cam. When the engine is employed for the propulsion of a steam vehicle this shifting fork may have suitable linked connection with a foot pedal, whereby the engine may be conveniently simpled at any time. The cam shaft 14 may be shifted through the medium of any suitable shifting means, exemplified by the shifting lever 51 having its inner forked end bearing between the collars 52. The cam shaft is driven at crank shaft speed through a suitable train of gears as illustrated, or through any other suitable driving connection, the driving wheel 53 on the cam shaft having a splined connection 54 with the shaft in order to permit of its axial shifting.

In operation, the steam is admitted at boiler pressure into the high pressure cylinder 4 under the control of the poppet admission valve 12. Different periods of cut-off can be obtained by the axial shifting of the cam shaft 14 in order to dispose different points of the diagonal cam shoulder 23 in alignment with the tappet end of the valve stem 13. The eccentric 34 is so timed with the stroke of the piston 9 that during admission and substantially throughout the entire expansion stroke in the high pressure cylinder, the port 7' is blocked by the upper valve piston 26. When the piston 9 reaches substantially its lower dead center position, the transfer valve 25 has moved upwardly sufficiently far to cause the piston 26 to uncover the port 7' and allow the partially expanded body of steam to enter the space 29 between the pistons. The high pressure piston 9 has a diametrically opposite crank position to the low pressure piston 10, and consequently, when this high pressure piston is in its lower position the piston 10 is at the top of its stroke ready to produce a working stroke. The steam entering the valve space 29 has direct communication with the low pressure cylinder 5 through the passageway 37 and consequently this steam from the high pressure cylinder goes through a second expansion in the cylinder 5 in exerting power on the piston 10. During this downward travel of the piston 10 the passageway 38 is blanked by the raised position of the piston 26 closing communication between said passage and the bore 24'. When the piston 10 reaches the bottom of its stroke exhaust occurs from the low pressure cylinder through the ports 42, the piston 26 having at this time moved down to close the port 7' and prevent steam admitted to the high pressure cylinder from entering the low pressure cylinder 5 On the return stroke of the low pressure piston 10 a certain volume of steam is expelled through the passageway 38 and bore 24' before the raising of the piston 26 closes the passageway 38. This prevents the creation of excessive compression pressure The passageway 38 is so disposed relative to the port 7' that it will be closed a sufficient period in advance of the opening of the port 7' to insure the development of an adequate compression in the cylinder 5 before the transfer of steam occurs. By shifting the cam shaft 14 a wide variation of cut-off can be secured through infinitely small gradations. The range of cut-off illustrated is shown as being from 15% to 80%, see Figure 2. When it is desired to develop maximum torque the simpling cam 49 is brought into line with the valve stem 47 by the actuation of the bell crank lever 50 and thereafter boiler pressure steam is admitted to the low pressure cylinder 5 where it mixes with the exhaust from the high pressure cylinder, through a part of or through the entire power stroke of the piston 10.

The approximate timing of the valves is illustrated in the valve event diagram of Figure 2, and will be obvious therefrom. It will be apparent that the embodiment illustrated is merely diagrammatic and may be widely departed from in the practical adaptation of the invention without departing from the scope thereof.

I claim:

1. In a multiple expansion steam engine, the combination of a high pressure cylinder, a low pressure cylinder, an inlet to said high pressure cylinder, an outlet from said low pressure cylinder, a single transfer valve controlling the transfer of steam between said cylinders, and venting means cooperating with said transfer valve to afford a compression relief function for one of said cylinders.

2. In a multiple expansion steam engine, the combination of a high pressure cylinder, a low pressure cylinder, an inlet to said high pressure cylinder, an outlet from said low pressure cylinder, a single valve controlling the transfer of steam between said cylinders, and outlet means cooperating with said valve to relieve compression from said low pressure cylinder.

3. In a multiple expansion steam engine, the combination of a high pressure cylinder, a low pressure cylinder, a valve chamber, ports connecting each of said cylinders with said valve chamber, a cylindrical valve in said chamber controlling said ports, and means controlled by said valve for relieving the development of excessive compression pressures in one of said cylinders.

4. In a multiple expansion steam engine, the combination of a high pressure cylinder, a low pressure cylinder, a valve chamber intermediate said cylinders, ports connecting said cylinders with said valve chamber, a reciprocating cylindrical valve in said chamber having a steam passage therein adapted to communicate with said ports, and a compression relief port extending from one of said cylinders to said valve chamber and adapted to be controlled by said valve.

5. In combination, a steam engine cylinder, a valve chamber, an inlet passage leading from said valve chamber to said cylinder, a valve in said chamber comprising a reciprocating valve stem and a piston valve on said stem, a steam passageway in said valve adapted to communicate with said inlet passageway, and a compression relief port extending from said cylinder into said valve chamber and controlled by said valve.

6. A multiple expansion steam engine, the combination of a high pressure cylinder, a low pressure cylinder, a common cam shaft, an inlet to said high pressure cylinder, a poppet valve controlling said inlet, variable cut-off mechanism driven by said cam shaft for operating said inlet poppet valve, a transfer passageway between said cylinders, a cylindrical valve controlling said passageway, means driven by said cam shaft for operating said cylindrical valve, a steam inlet leading directly to said low pressure cylinder for simpling the same, a poppet valve controlling said inlet, means on said cam shaft for operating said simpling poppet valve, and means for bringing said latter means into operation during any period of cut-off of said inlet poppet valve.

7. In a multiple expansion steam engine, the combination of a high pressure cylinder, a low pressure cylinder, a common cam shaft, an inlet to said high pressure cylinder, a poppet valve controlling said inlet, variable cut-off cam means on said cam shaft for controlling said inlet poppet valve, a transfer passageway between said cylinders, a reciprocating cylindrical valve controlling said passageway, an eccentric on said cam shaft for actuating said cylindrical valve, a steam inlet to said low pressure cylinder for admitting boiler pressure steam to said low pressure cylinder independently of the flow through said high pressure cylinder, a simpling poppet valve controlling said latter inlet, a cam on said cam shaft for operating said latter valve and means for bringing said cam into operative association with said simpling poppet valve.

In witness whereof, I hereunto subscribe my name this 6th day of October, 1921.

LEWIS M. ELLIS.